(12) United States Patent
Kulczyk

(10) Patent No.: US 10,876,878 B2
(45) Date of Patent: Dec. 29, 2020

(54) LIQUID LEVEL MONITORING SYSTEM

(71) Applicant: WESTON AEROSPACE LIMITED, Hampshire (GB)

(72) Inventor: Wojciech Konrad Kulczyk, Hampshire (GB)

(73) Assignee: WESTON AEROSPACE LIMITED, Farnborough (GB)

(*) Notice: Subject to any disclaimer, the term of this patent is extended or adjusted under 35 U.S.C. 154(b) by 104 days.

(21) Appl. No.: 15/938,261

(22) Filed: Mar. 28, 2018

(65) Prior Publication Data
US 2018/0283924 A1 Oct. 4, 2018

(30) Foreign Application Priority Data

Mar. 29, 2017 (GB) .................................. 1705039.4

(51) Int. Cl.
*G01F 23/14* (2006.01)
*G01F 23/18* (2006.01)
*G01F 23/16* (2006.01)

(52) U.S. Cl.
CPC .............. *G01F 23/14* (2013.01); *G01F 23/18* (2013.01); *G01F 23/161* (2013.01); *G01F 23/185* (2013.01)

(58) Field of Classification Search
CPC ........ G01F 23/18; G01F 23/185; G01F 23/14; G01F 23/16
See application file for complete search history.

(56) References Cited

U.S. PATENT DOCUMENTS

| 4,935,727 A | 6/1990 | Re Fiorentin et al. |
| 5,351,725 A | 10/1994 | Suthergreen et al. |
| 6,282,953 B1 | 9/2001 | Benjey |
| 6,434,494 B1 | 8/2002 | Forsythe, Jr. et al. |
| 6,490,920 B1 | 12/2002 | Netzer |

(Continued)

FOREIGN PATENT DOCUMENTS

| CN | 103674161 A | 3/2014 |
| CN | 203629635 U | 6/2014 |

(Continued)

OTHER PUBLICATIONS

GB Patent Application No. 1705039.4, Search Report under Section 17(5), dated Jul. 3, 2017, 7 pages.

(Continued)

*Primary Examiner* — Paul M. West
(74) *Attorney, Agent, or Firm* — Fredrikson & Byron, P.A.

(57) ABSTRACT

A liquid level monitoring system for monitoring the level of liquid in a tiltable tank, which may tilt or rotate in a tilt or rotation plane about a tilt axis. The system comprises a pair of pressure sensors comprising a first pressure sensor for sensing the pressure of the liquid in the tank at a first position located towards the bottom of a tank and a second pressure sensor for sensing the pressure of the liquid in the tank at a second position located a known pre-defined distance above the first sensing wherein the two sensing positions are located on a sensing line substantially orthogonal to and passing through a liquid surface dividing line, said liquid surface dividing line being the line along and extending past the surface of liquid in the tank whose position relative to the tank walls remains the same as the tank tilts about the tilt axis.

16 Claims, 3 Drawing Sheets

(56) References Cited

U.S. PATENT DOCUMENTS

| | | |
|---|---|---|
| 7,004,023 B2 | 2/2006 | Merrild |
| 7,032,449 B2 | 4/2006 | Rivas |
| 7,140,404 B2 | 11/2006 | Cupples et al. |
| 8,400,320 B2 | 3/2013 | Santos |
| 8,479,572 B2 | 7/2013 | Onishi et al. |
| 9,377,341 B1 | 6/2016 | Watson |
| 2006/0266111 A1* | 11/2006 | Gourlay .................. G01F 23/14 |
| | | 73/299 |
| 2007/0234795 A1 | 10/2007 | Goto |
| 2010/0070061 A1 | 3/2010 | Volto et al. |
| 2011/0000295 A1 | 1/2011 | Kritlow |
| 2015/0100253 A1 | 4/2015 | Austerlitz et al. |

FOREIGN PATENT DOCUMENTS

| | | |
|---|---|---|
| FR | 2596150 A1 | 9/1987 |
| JP | 60-253919 | 12/1985 |
| JP | 2000292240 A | 10/2000 |

OTHER PUBLICATIONS

European Patent Application No. 18164068.1, Extended European Search Report dated Aug. 13, 2018, 6 pages.

* cited by examiner

LIQUID LEVEL MONITORING SYSTEM

This application claims priority to GB Patent Application No. 1705039.4 filed Mar. 29, 2017, the entire content of which is hereby incorporated by reference.

The present invention is concerned with a liquid level monitoring system for monitoring the level of liquid in a tiltable tank. Particular embodiments of the invention may be used to monitor the level of oil in the oil tank for an aero engine. The attitude and hence tilt of an aircraft and a tank within it changes during flight; particularly during take-off and landing. It is important to accurately measure oil levels in aero engine oil tanks so it is desirable to be able to do so in tanks which tilt.

There are a number of known mechanisms for monitoring the level of fluid in a tank. These include a mechanical gauge with a float mounted to a float arm. The float sits on the surface of the fluid (which might be oil in an oil tank or fuel in a fuel tank) and moves with changes in the level of the fluid. That movement is picked up and monitored by the mechanical gauge. It is also known to have a magnetic float which switches a reed relay.

It is also known to measure the level of oil in a sealed tank for feeding or maintaining oil in an engine or other mechanism with moving parts requiring lubrication by measuring the pressure of the liquid towards the bottom of the tank and the pressure of the gas above the liquid. Such arrangements are described in, for example, U.S. Pat. No. 7,140,404, US 2011/0000295, U.S. Pat. Nos. 8,479,572 and 8,400,320. Such arrangements work by making use of the fact that the pressure at a point in a liquid is a function of the height of the liquid above that point, the density of the liquid and the pressure of the gas or atmosphere above the liquid.

A problem with such arrangements is that they are unsuitable for accurately monitoring the level of liquid in a tank having an attitude which changes (for example, by tilting as an oil or fuel tank in an aircraft would do during flight and particularly during take-off and landing). Changes in attitude of the tank affect the height of liquid above the sensor located in the liquid and thereby make the measurements derived from those sensors inaccurate. Further errors may arise in such systems as the density of the fluid in the tank varies (with, for example, changes in temperature). Such known arrangements (see, for example, U.S. Pat. No. 8,400, 320) may therefore also include an additional temperature sensor so as to determine temperature and compensate for temperature effects on density (and hence the measurement of liquid level using pressure sensors).

U.S. Pat. Nos. 7,032,449 and 6,282,953 disclose arrangements with a pair of pressure sensors located a known distance apart. In, for example, U.S. Pat. No. 6,282,953 a pair of solid state pressure sensors are disposed near the bottom of a fuel tank vertically spaced with one a unit distance above the other. A third solid state sensor is disposed in the tank at the highest point under the upper wall. The apparent hydrostatic pressure is computed from the difference in pressure sensed by the highest and lowest sensors. The liquid density is computed from the difference in pressure sensed by the pair of sensors near the tank bottom; and, the difference normalized for the vertical distance therebetween. The liquid level height is then computed from computed density and apparent pressure. The reserve volume of liquid fuel is then found for the computed height from a lookup table of values of liquid height and corresponding liquid volume.

The prior art arrangements are not suitable for accurately determining the amount of liquid (e.g. oil in an oil tank for an aero engine) in a tiltable or tilting tank as the tilt introduces an error by changing the height or amount of liquid above the sensors as the tank tilts whilst the liquid level remains substantially horizontal even if there is actually no change in the amount of liquid in the tank. Arrangements such as that described in U.S. Pat. No. 6,282,953 have therefore been considered unsuitable for accurately monitoring liquid level in tilting or tiltable tanks.

JP 60-253919 discloses a system for detecting the amount of liquid in a tiltable tank which includes a detection shaft arranged inside the tank. The detection shaft runs through the positions of the centre of gravity of the surface of the liquid in the tank at each possible height of liquid in the tank. The detection shaft includes liquid height sensors arranged along the detection shaft for determining the presence of fluid at the sensor locations in the detection shaft and thereby determining the height of liquid in the shaft.

The system of JP 60-253919 requires a physical detection shaft running through the inside of the tank. It is therefore difficult and expensive to build. The internal detection shaft is also prone to misalignment as it becomes loose and is therefore prone to failure and errors. An internal detection shaft takes up space within a tank and is therefore also not suitable for narrow or small tanks.

The system of JP 60-253919 also cannot be used with pressure sensors as it requires the measuring of the length of the column of liquid within the non-vertical detection shaft. The output of a pressure sensors is a function of the vertical height of liquid above it.

The inventor of the invention described in this application is the first to realise that an arrangement with a pair of pressure sensors or transducers at carefully selected positions can compensate for the effects of tilt or changes in the attitude of a tank.

The present invention in a first aspect provides a liquid level monitoring system for monitoring the level of liquid in a tiltable tank, wherein the tank tilts or rotates in a tilt or rotation plane about a tilt axis, the system comprising: a pair of pressure sensors comprising a first pressure sensor for sensing the pressure of the liquid in the tank at a first position located towards the bottom of a tank and a second pressure sensor for sensing the pressure of the liquid in the tank at a second position located a known pre-defined distance above the first sensing position, wherein the two sensing positions are located on a sensing line passing through a liquid surface dividing line, said liquid surface dividing line being the line along and extending past the surface of liquid in the tank whose position relative to the tank walls remains the same as the tank tilts about the tilt axis.

The claimed arrangement allows one to determine the level of fluid in a tilting or tiltable tank where the position of the likely tilt axis is known or predictable. The claimed arrangement is relatively easy to build, maintain and/or retro-fit to an existing tank as it does not require an internal detection shaft or sensors arranged along such an internal detection shaft. Pressure is the same at positions having the same height of fluid above them so pressure can be sensed at or towards the tank walls.

Preferably and/or alternatively the sensing positions are each located on a wall of the tank.

Such sensors are easy to fit, retro-fit and/or replace.

Preferably and/or alternatively, the liquid surface at the zero tilt position defines a zero tilt surface plane relative to the walls of the tank and the liquid surface at the tilted position defines a tilted surface plane relative to the walls of the tank, and wherein the volume between a first side of the liquid surface dividing line, the walls of the tank and between the zero tilt surface plane and tilted surface plane is equal to the volume between the opposite second side of the liquid surface dividing line, the walls of the tank and between the zero tilt surface plane and tilted surface plane.

Preferably and/or alternatively, the liquid surface dividing line passes through the centre of gravity of the surface of the liquid in the tank.

Preferably and/or alternatively, the systems includes at least one further second pair of pressure sensors, second pair of liquid height level transducers for monitoring the level of liquid in a tiltable tank, wherein the tank tilts or rotates in a tilt or rotation plane about a second tilt axis and wherein the two respective first and second pressure sensors transducers of the second pair of pressure sensors transducers are located at two respective further sensing positions and wherein the further sensing positions are located on a second sensing line substantially orthogonal to and passing through a second liquid surface dividing line, said second liquid surface dividing line being the line along and extending past the surface of liquid in the tank whose position relative to the tank walls remains the same as the tank tilts about the second tilt axis.

Such an arrangement allows one to determine the level of liquid in a tank which is not symmetrical and therefore has a surface dividing line whose position varies according to the height of liquid in the tank and hence the shape of the surface of liquid at that height. A pair of pressure sensors may be provided for each level of liquid which is to be determined.

Preferably and/or alternatively, at least one pressure sensor comprises a hole or aperture in the tank wall in communication via a tube or conduit with a pressure transducer located away from that hole or aperture.

Such sensors are easy to fit, retro-fit and/or replace.

Preferably and/or alternatively, the system comprises at least two holes or apertures each defining a pressure sensor at a respective position, and wherein the at least two holes or apertures are each in communication via a tube or conduit with the same pressure transducer located away from those holes or apertures.

Such sensors are easy to fit, retro-fit and/or replace.

Preferably and/or alternatively, the system is for monitoring the level of liquid in an aircraft tank. Aircraft tilt or bank as they are maneuvered. The tilt axis about which they are likely to bank is reasonably predictable which means that it is relatively easy to define the necessary sensing locations for that tilt and the tank being monitored, and to hence locate the pressure sensors at the appropriate locations.

Preferably and/or alternatively, the system is for monitoring the level of liquid in a lubricant or oil tank for an aero engine. Lubricant tanks are reasonably small and may have highly irregular shapes so as to fit around other elements of the aircraft (for example, the engine they feed lubricant to).

The invention in a second aspect provides liquid level monitoring system for monitoring the level of liquid in a tiltable tank, wherein the tank tilts or rotates in a tilt or rotation plane about a tilt axis, the system comprising: a pair of pressure sensors comprising a first pressure sensor for sensing the pressure of the liquid in the tank at a first position located towards the bottom of a tank and a second pressure sensor for sensing the pressure of the liquid in the tank at a second position located a known pre-defined distance above the first sensing position, wherein the two sensing positions are located on a sensing line passing through the centre of gravity of the surface of the liquid.

As used herein, the terms "preferably", "may", and "optionally", refer to features of the present invention which are not essential, but which may be combined with the claimed subject matter to form various embodiments of the invention.

Furthermore, any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

Embodiments of the invention will now be described by way of non-limiting examples with reference to the attached figures, in which.

An aero engine requires very precise measurements of oil levels in the tank. These measurements have to be made for different kinds of oil having various densities and operating at different temperatures. Oil density changes with temperature so it is not straightforward to compensate or allow for changing oil densities.

Figure 1:
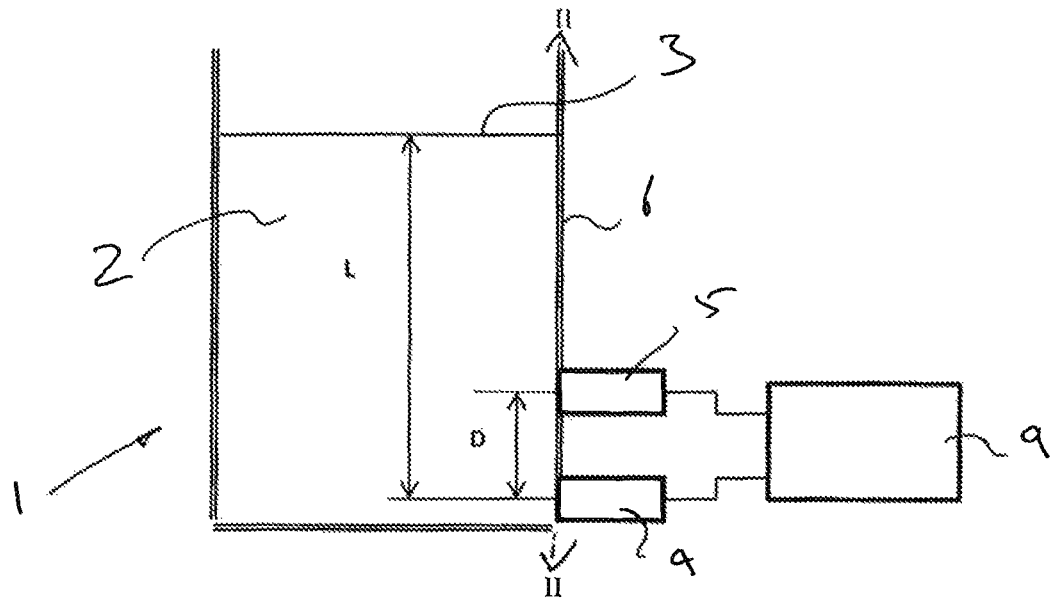
FIG. 1 is a diagrammatic cross-section through a tank including a monitoring system embodying the invention.

Referring to FIG. 1 (which is not to scale), an aero engine oil tank 1 contains liquid oil 2 with a liquid surface 3 parallel to the ground. Two pressure sensors or transducers 4, 5 are provided on a side 6 of the tank 1 to sense the pressure at first and second sensing points 7, 8 which are located one above the other. The transducer outputs are connected to a processor 9 for determining liquid levels and otherwise monitoring the liquid 2 in the tank. The first sensor 4 is for sensing the height of liquid above its sensing location 7 and the second sensor 5 is used to compensate for both liquid density and tank tilt as described below. The pressure sensors 4, 5 may be pressure transducers located directly on the tank wall at the respective locations. Alternatively they may be holes or orifices in the tank wall at the respective pressure sensing locations 4, 5 which are in communication with remotely located transducers via a sealed tube or channel. The two sensing locations may be in communication with separate remote transducers or the same remote transducer.

When a pressure sensor is used to detect oil level, its pressure readings are a function of the height of oil above the sensor or transducer.

Pressure $P_1$ is a fraction of oil column height, L and the oil density, $\rho$:

$$P_1 = g\, L \rho,$$

Where g is the gravity acceleration or gravity constant

Therefore the oil level L above a sensor 4 can be calculated from $$L = P_1/g\, \rho$$

The measuring system must operate correctly for different oil densities and temperatures which affect oil density. Since oil density is an unknown parameter it is necessary to provide a system which will compensate for different and varying oil densities.

This is achieved in a preferred or alternative embodiment of the subject invention by placing an additional pressure sensor 5 in a vertical line above the original pressure sensor 4 at a known distance D (see FIG. 1).

The second pressure transducer reading $P_2$ is $$P_2 = g(L-D)\rho$$

The difference between the pressure readings $P_1$ and $P_2$ is $$P_1 - P_2 = g\,D\,\rho$$

Therefore the oil density is calculated from $$\rho = (P_1 - P_2)/g\,D$$

Therefore the oil level L above the lower pressure transducer 4 is calculated from $$L = P_1 D/(P_1 - P_2)$$

The determined level of the oil level measurement L is therefore independent of the oil density. The use of two transducers 4, 5 measuring pressure at two vertically separated locations 7, 8 can therefore be used to compensate or allow for changes in density of the liquid 2.

Figure 2:
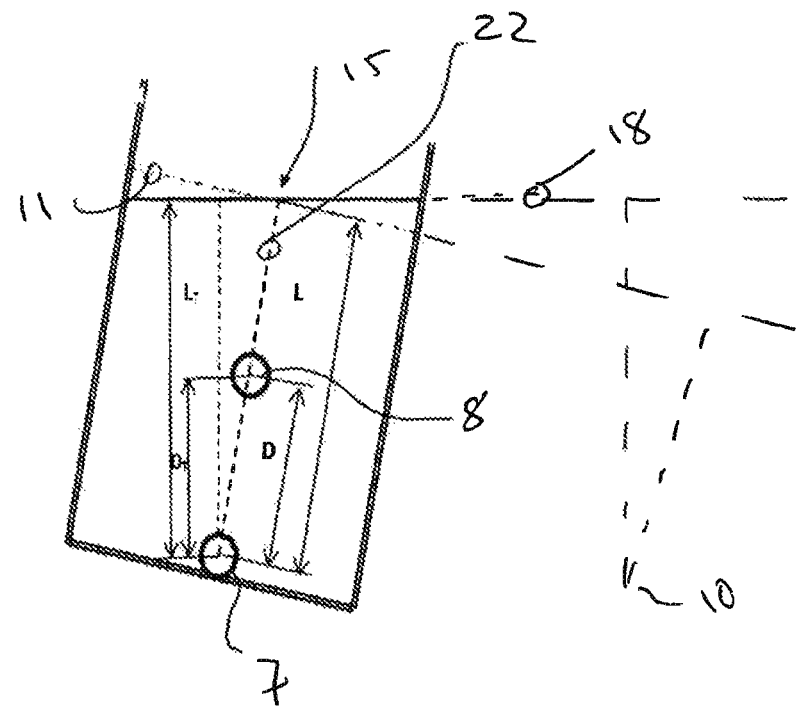
FIG. 2 is a diagrammatic cross-section along the line II-II of FIG. 1 illustrating how an embodiment of the invention with a symmetrical tank may compensate for tilt of the tank.
Figure 4:
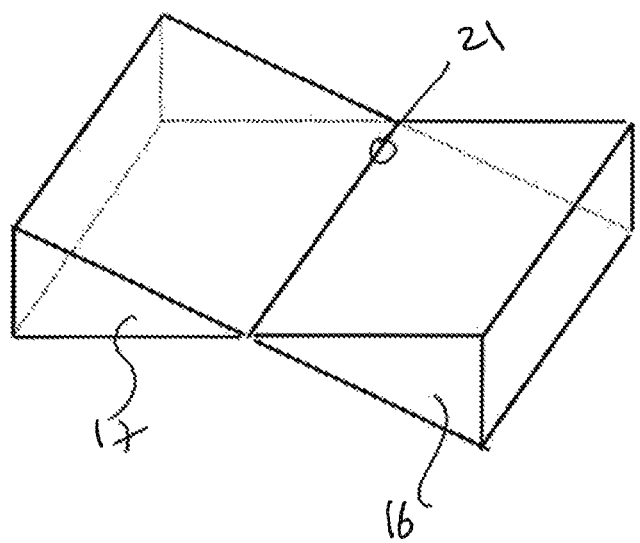
FIG. 4 is a diagrammatic perspective of the upper portions of FIGS. 2 and 3 illustrating how one selects the location of the transducers shown in FIG. 3.

Referring to FIGS. 2 and 4, when the aircraft containing the tank 1 changes its attitude (by, for example, banking or pitching), the tank will tilt or rotate about a tilt or rotation axis 10. The surface 3 of the liquid remains horizontal to the ground. With banking movement the acceleration force is not vertical. The level of liquid should not be horizontal but stay unchanged. The location of the tilt axis 10 will depend on the nature of the change in attitude of the aircraft and hence the tank within that aircraft. The height of liquid above the first or lower pressure transducer 4 becomes $L_T$ (rather than L as it was or would be with zero tilt), and the height of liquid above the second or upper pressure transducer becomes $L_T - D_T$ (rather than L–D as it was or would be for zero tilt)

For a symmetrical tank (see FIG. 2) when the tank 1 is tilted the pressure transducers 4,5 measure different pressures corresponding to the vertical liquid column heights $L_T$ and $D_T$ affecting how tilting the tank alters the height of the liquid column as the liquid surface 3 remain horizontal whilst the tank walls move relative thereto. For reference, FIG. 2 includes a line 11 showing the position relative to the tank walls of the liquid surface when the tank is not tilted the "zero tilt surface" relative to the tank walls).

$$P_1 = gL_T\rho$$

$$P_2 = g(L_T - D_T)\rho$$

$$L_T = P_1 D_T/(P_1 - P_2)$$

From FIG. 2

$$L_T = L\cos\alpha$$

$$D_T = D\cos\alpha$$

Therefore $$L = L_T/\cos\alpha = P_1 D/(P_1 - P_2)$$

Since the value of D is known the correct liquid level can be established.

Aero engines may use oil tanks which might have very irregular shapes, e.g. semi-circular with variable cross-section and/or wrapped around an engine. Aircraft attitude might change during flight especially during take-off and landing and a system for monitoring oil liquid level should provide correct oil level under such conditions.

Figure 5:
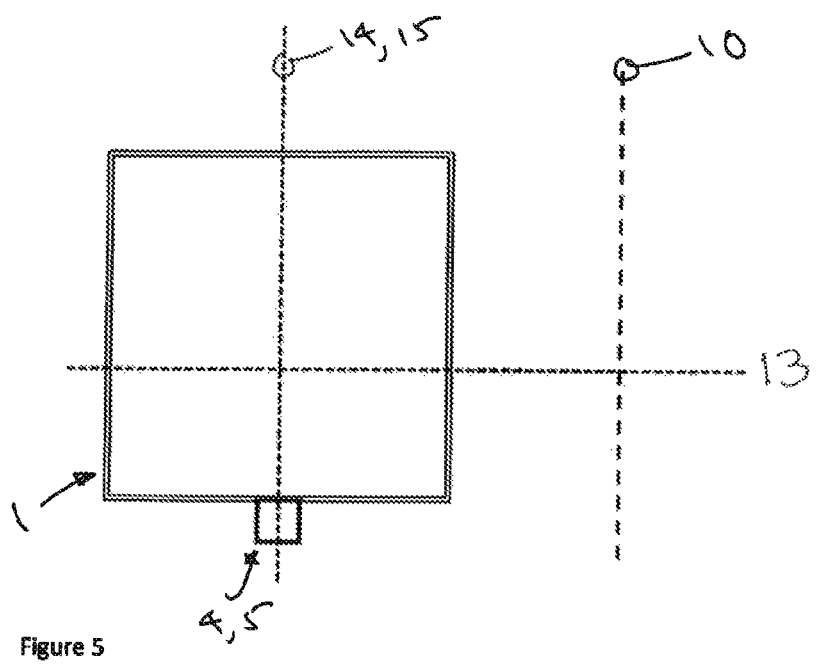
FIG. 5 is a top diagrammatic view of the embodiments of the invention described with reference to FIGS. 1 to 4

As discussed above, the inventor of the subject application has realised that the position of the two pressure transducers 4, 5 is very important for the tilt compensation. When the tank horizontal profile is regular or symmetrical such as a rectangle or circle the two pressure transducers 4, 5 should be placed in the plane at 90 degrees to the tank tilt or rotation plane 13 (which is one of the planes rotatable about the tilt axis 10 of the tank 1 references) (see FIG. 5), and that plane 14 containing the two transducers (the transducer plane 14) should be crossing the surface of the liquid in the tank in the middle of the tank. This crossing or surface dividing line 15 will be stationary regardless of the tilt value. Referring to FIGS. 2 and 4, the volume 16 defined by a first side of the surface dividing line 15, the walls 20 of the tank and between the zero tilt surface plane 11 and the tilted surface plane 15 is equal to the volume 17 defined by the second opposite side of the surface dividing line 15, the walls 20 of the tank and between the zero tilt surface plane 11 and the tilted surface plane 18.

However when the tank profile is not symmetrical, the crossing or surface dividing line 15 will not be in the middle but must be established experimentally or analytically for a particular tilt axis 10. Aeroplanes and other aero vessels tend to tilt about a known axis so it is possible to establish the location of the crossing or surface dividing line for different levels of liquid in a, for example, the oil or lubricant tank for an aero engine in an aeroplane. In general during the tilt a new liquid level line 18 (plane) will be crossing the non-tilted liquid level line 11 (plane) in some point 21. To provide compensation the transducer plane 14 (or sensing line 22 containing the two transducers 4, 5) must be crossing this point (line) and be orthogonal to it. It is possible that for a highly irregular tank profile this crossing point (line) 21 could be shifting as a function of the tilt angle $\alpha$. In such a case a new set of pressure transducers must be provided in a different plane for different crossing or dividing line locations.

Figure 3:
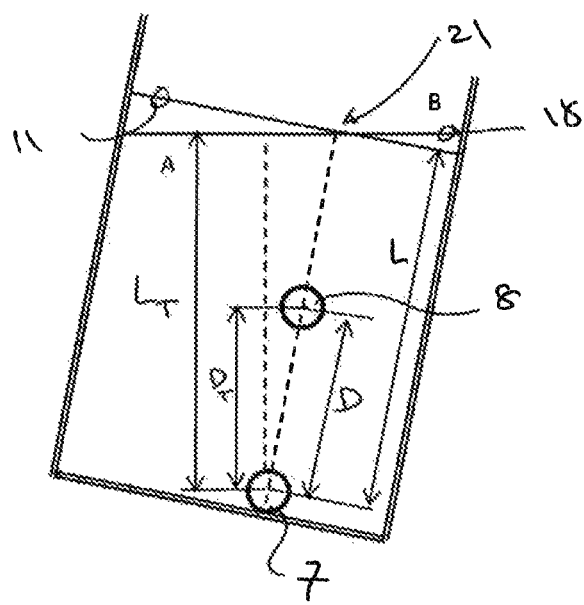
FIG. 3 is a diagram similar to that of FIG. 2 but illustrating an alternative embodiment with an irregular tank.

In order to establish the crossing or dividing surface line 21 analytically one would have to calculate a volume of liquid 16 in the tank between the original plane 11 of liquid at zero tilt and the new plane 18 of liquid when the new tilted level is above the old untilted level (right hand side of FIGS. 3 and 4) and compare with the volume 19 when the new tilted level is below the old untilted level (left hand side of FIGS. 3 and 4). The crossing or dividing line is the location which leads to those two volumes 16, 19 being equal. The crossing or dividing line for each height of liquid in the tank passes through the centre of gravity of the plane of the surface of the liquid at that level.

In closed tanks there will be a pressure build up above the liquid which would affect accuracy of the level measurements. In such a case a pressure transducer can be placed above the liquid level to compensate for that pressure. Such an arrangement is described in, for example, U.S. Pat. No. 6,282,953.

In FIGS. 1 to 5 above the pressure transducers 4, 5 are described as being in different locations. Alternatively it may be more convenient to place all pressure sensors in one place and run pipes from the tank sensing locations to the sensors, and/or to have a single pressure sensor in communication via fluid channels or pipes with the different sensing locations. The sensing locations would be holes or apertures in the tank wall at the selected positions.

The specific embodiments and examples described above illustrate but do not limit the invention. It is to be understood that other embodiments of the invention may be made and the specific embodiments and examples described herein are not exhaustive.

The invention claimed is:

1. A liquid level monitoring system for monitoring the level of liquid in a tiltable tank, wherein the tank tilts or rotates in a tilt or rotation plane about a tilt axis, the system comprising:
   a tank configured to tilt or rotate about a pre-determined or known tilt axis; and
   a pair of pressure sensors comprising a first pressure sensor for sensing the pressure of the liquid in the tank at a first position located towards the bottom of a tank and a second pressure sensor for sensing the pressure of the liquid in the tank at a second position located a known pre-defined distance above the first sensing position;
   wherein the two sensing positions are located on a sensing line passing through a liquid surface dividing line, said liquid surface dividing line being the line along and extending past the surface of liquid in the tank whose position relative to the tank walls remains the same as the tank tilts about the tilt axis.

2. A monitoring system according to claim 1 wherein the sensing positions are each located on a wall of the tank.

3. A monitoring system according to claim 1 wherein the liquid surface at the zero tilt position defines a zero tilt surface plane relative to the walls of the tank and the liquid surface at the tilted position defines a tilted surface plane relative to the walls of the tank,
   and wherein the volume between a first side of the liquid surface dividing line, the walls of the tank and between the zero tilt surface plane and tilted surface plane is equal to the volume between the opposite second side of the liquid surface dividing line, the walls of the tank and between the zero tilt surface plane and tilted surface plane.

4. A monitoring system according to claim 1 wherein the liquid surface dividing line passes through a geometric centroid of the surface of the liquid in the tank.

5. A monitoring system according to claim 1 including at least one further second pair of pressure sensors, wherein the two respective first and second pressure sensors of the second pair of pressure sensors are located at two respective further sensing positions located on a second sensing line passing through a second liquid surface dividing line, said second liquid surface dividing line being the line along and extending past the surface of liquid in the tank whose position relative to the tank walls remains the same as the tank tilts about the tilt axis; wherein the first surface dividing line is a line along the surface of the liquid in the tank when that surface is at a first level and the second surface dividing line is a line along the surface of the liquid in the tank when that surface is at a second level different from the first level.

6. A monitoring system according to claim 1 wherein at least one pressure sensor comprises a hole or aperture in the tank wall in communication via a tube or conduit with a pressure transducer located away from that hole or aperture.

7. A monitoring system according to claim 6 comprising at least two holes or apertures each defining a pressure sensor at a respective position, and wherein the at least two holes or apertures are each in communication via a tube or conduit with the same pressure transducer located away from those holes or apertures.

8. A monitoring system according to claim 1 for monitoring the level of liquid in an aircraft tank.

9. A monitoring system according to claim 1 for monitoring the level of liquid in a lubricant or oil tank for an aero engine.

10. A liquid level monitoring system for monitoring the level of liquid in a tiltable tank, wherein the tank tilts or rotates in a tilt or rotation plane about a tilt axis, the system comprising:
    a tank configured to tilt or rotate about a predetermined or known tilt axis; and
    a pair of pressure sensors each located on a wall of the tank and comprising a first pressure sensor for sensing the pressure of the liquid in the tank at a first position located towards the bottom of a tank and a second pressure sensor for sensing the pressure of the liquid in the tank at a second position located a known pre-defined distance above the first sensing position;
    wherein the two sensing positions are located in a sensing plane that passes through a geometric centroid at a surface of the liquid at height of the liquid to be monitored, the centroid falling within a crossing surface line, whereby a line connecting the two sensing positions is orthogonal to the crossing surface line regardless of tilt of the tank.

11. A method of monitoring the level of liquid in a tiltable tank, wherein the tank tilts or rotates in a tilt or rotation plane about a tilt axis, the method comprising:
    providing a tank configured to tilt or rotate about a known or pre-determined tilt axis, and providing a pair of pressure sensors comprising a first pressure sensor for sensing the pressure of the liquid in the tank at a first position located towards the bottom of a tank and a second pressure sensor for sensing the pressure of the liquid in the tank at a second position located a known pre-defined distance above the first sensing position;
    tilting the tank about the tilt axis; and
    determining the liquid level in the tank when the tank is tilted;
    wherein the two sensing positions are located on a sensing line passing through a liquid surface dividing line, said liquid surface dividing line being the line along and extending past the surface of liquid in the tank whose position relative to the tank walls remains the same as the tank tilts about the said tilt axis.

12. A method according to claim 11 wherein the sensing positions are each located on a wall of the tank.

13. A method monitoring system according to claim 11 wherein the liquid surface at the zero tilt position defines a zero tilt surface plane relative to the walls of the tank and the liquid surface at the tilted position defines a tilted surface plane relative to the walls of the tank, and wherein the volume between a first side of the liquid surface dividing line, the walls of the tank and between the zero tilt surface plane and tilted surface plane is equal to the volume between the opposite second side of the liquid surface dividing line, the walls of the tank and between the zero tilt surface plane and tilted surface plane.

14. A method according to claim 11 wherein the liquid surface dividing line passes through the geometric centroid of the surface of the liquid in the tank.

15. A method according to claim 11 including providing at least one further second pair of pressure sensors, wherein the two respective first and second pressure sensors of the second pair of pressure sensors are located at two respective further sensing positions located on a second sensing line passing through a second liquid surface dividing line, said second liquid surface dividing line being the line along and extending past the surface of liquid in the tank whose position relative to the tank walls remains the same as the tank tilts about the tilt axis;

wherein the first surface dividing line is a line along the surface of the liquid in the tank when that surface is at a first level and the second surface dividing line is a line along the surface of the liquid in the tank when that surface is at a second level different from the first level.

16. A method according to claim 11 for monitoring the level of liquid in a lubricant or oil tank for an aero engine.

* * * * *